(12) United States Patent
Barclay

(10) Patent No.: US 11,412,834 B2
(45) Date of Patent: Aug. 16, 2022

(54) NAIL WORKS

(76) Inventor: Debra Lynn Barclay, Tampa, FL (US)

( * ) Notice: Subject to any disclaimer, the term of this patent is extended or adjusted under 35 U.S.C. 154(b) by 36 days.

(21) Appl. No.: 11/982,822

(22) Filed: Nov. 5, 2007

(65) Prior Publication Data

US 2008/0138140 A1    Jun. 12, 2008

Related U.S. Application Data

(60) Provisional application No. 60/859,477, filed on Nov. 16, 2006.

(51) Int. Cl.
| | |
|---|---|
| *A45D 34/04* | (2006.01) |
| *A45D 29/00* | (2006.01) |
| *F16K 31/44* | (2006.01) |
| *B65D 51/24* | (2006.01) |

(52) U.S. Cl.
CPC ........... *A45D 34/045* (2013.01); *A45D 29/00* (2013.01); *A45D 29/007* (2013.01); *B65D 51/245* (2013.01); *F16K 31/44* (2013.01)

(58) Field of Classification Search
CPC .. A45D 34/045; A45D 34/046; A45D 34/047; A45D 34/04; A45D 29/00; A45D 29/007; A45D 29/04; A45D 29/06; A45D 29/17; A45D 29/18; A45D 2034/007; B65D 51/24; B65D 51/245; B65D 51/247; B65D 51/32; B65D 2251/06; B65D 25/20
USPC ............................ 401/6, 9–11, 13, 126, 194
See application file for complete search history.

(56) References Cited

U.S. PATENT DOCUMENTS

| | | | | | |
|---|---|---|---|---|---|
| 2,237,162 | A | * | 4/1941 | Robinson | A45D 34/00 434/100 |
| 2,248,011 | A | * | 7/1941 | Neuschaefer | 401/6 |
| 2,340,900 | A | * | 2/1944 | Robinson | A45D 34/00 434/100 |
| 4,373,632 | A | * | 2/1983 | VanZandt | A47F 7/285 206/457 |
| 4,886,078 | A | * | 12/1989 | Shiftman | 132/73 |
| 5,301,843 | A | * | 4/1994 | Groene et al. | 222/192 |
| 5,529,417 | A | * | 6/1996 | Burrlader | 401/129 |
| D443,507 | S | * | 6/2001 | Sexton et al. | D9/624 |
| 9,486,052 | B2 | * | 11/2016 | Kemeny, Jr. | B65D 25/20 |
| 2004/0107609 | A1 | * | 6/2004 | Brown | B65D 51/24 40/311 |
| 2005/0166937 | A1 | * | 8/2005 | Taft | A45D 29/18 132/73 |
| 2007/0017543 | A1 | * | 1/2007 | Thiebaut | A45D 40/24 132/294 |

* cited by examiner

*Primary Examiner* — Don M Anderson
(74) *Attorney, Agent, or Firm* — Nath, Goldberg & Meyer; Richard C. Litman

(57) ABSTRACT

Nail Works is a nail polish bottle's cap acting as an application tool to aid in the process of polishing. Nail Works includes a nail polish bottle filled with paint, a lid with depending wand having a brush and the lid with an attached nail. The attached nail may slide into a position that is appropriate for use and then retract into its original position. The nail bearing the color of paint within the bottle is thin and concave in nature and acts as a scraping device to rid the cuticles of excess paint. Its sleek dimensional design allows it to lye flush against the customer's nail bed facilitating in correct color choice based upon skin tone and not just looks.

5 Claims, 8 Drawing Sheets

NAIL WORKS

CROSS-REFERENCE TO RELATED APPLICATION

This application claims the benefit of U.S. Provisional Patent Application Ser. No. 60/859,477, filed Nov. 16, 2006.

BACKGROUND OF THE INVENTION

1. Field of the Invention

The present invention relates to a nail polish bottle having a lid that provides the user an effective way to apply nail polish to remove excess paint from around cuticles and to make a correct color choice based upon skin tone.

2. Description of the Related Art

Women have applied nail polish to their fingernails and toenails for centuries yet not with ease. Many women have complained of ruining their fingernail paint while trying to paint their toenails. It is inevitable that during the process of painting the nail, paint adheres to the cuticle areas. In a quick response people use their thumbnail to get in the crevices and swipe off the paint. This is unsanitary and messy especially when trying to paint their toenails one color while their fingernails were painted a different color in a salon. Salon painted nails is expensive and messing them up while painting the toenails is not only messy it is time consuming. Occasionally ear swabs have been used to swipe off excess paint, but their diameter is too large to appropriately get in between the nail bed and the cuticle area. Either way the process is messy, time consuming, costly, and unsanitary. Therefore, it is highly desirable to have a handy tool to facilitate the removal of unwanted polish. Nail Works' concave and thin shape was designed to go between the customer's original nail bed and cuticle swiping off excess paint without difficulty.

Another problem in today's market is the mess being created when people open up nail polish bottles to test the paint either on their nail bed or on the shelves of the store. This is not only messy and unsanitary but it opens up the potential bottle of purchase to decay.

It is therefore desirable to have a cap feature that makes a true representation of the color inside as well as allow the customer to see how the color matches the skin tone before purchase. A color swatch attached to or somewhere outside of a bottle is not sufficient enough to make a correct color choice. Thus Nail Works was designed in the likeness of a true nail and will lye flush against the customer's nail bed taking on the appearance of their original nail after having been painted. In the beauty industry, only by trying on the color can customers become truly satisfied. For example women buy makeup all the time based upon what they see and then they take it back because after they apply it to their skin they no longer like it. Again just looking upon a color swatch is not sufficient; it is not a precise work of art.

SUMMARY OF THE INVENTION

The lid of the bottle will have at least one side wall; the lid may be shaped like a finger. The lid will have a fake fingernail attached to its main surface which will extend over the top of the lid. The fake fingernail will act as a tool by providing three primary functions: scraping paint, choosing color, and preserving paint. It is therefore desirable as an object of the invention to provide a nail polish bottle cap with an integral member that can provide a nail polish application tool to compensate for inaccurate application.

It is also an object of the invention to have a nail polish bottle cap having an integral member therein which represents an accurate portrayal of the contents after application to a customer.

Unlike any other bottle cap, Nail Works will have the ability to slide positioning it out of the way when it is not in use. This is ideal for packaging and storage purposes. Because Nail Works is completely concave and thin in nature it is able to lye flush on one's nail bed and swipe paint clean.

DETAILED DESCRIPTION OF THE PREFERRED EMBODIMENTS

Figure 1:
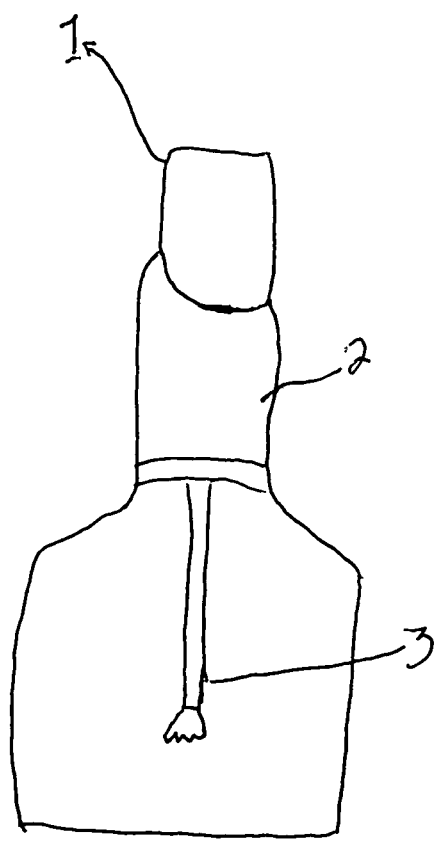
FIG. 1 shows a nail polish bottle with the integral nail member attached as a protruding portion of the cap.

Depicted in FIG. 1 is a cap structure for a nail polish bottle, the nail polish bottle having a reservoir portion for the containment of the polish component and a cap portion housing an applicator and the novel color indicator tool 1 of the invention. The drawing shows the combination color carrier and tool as a protruding portion of the cap structure 2. The cap also has an applicator portion 3 which here is shown as a brush, but any known application device is contemplated as being capable of being used in the inventive cap.

Figure 2:
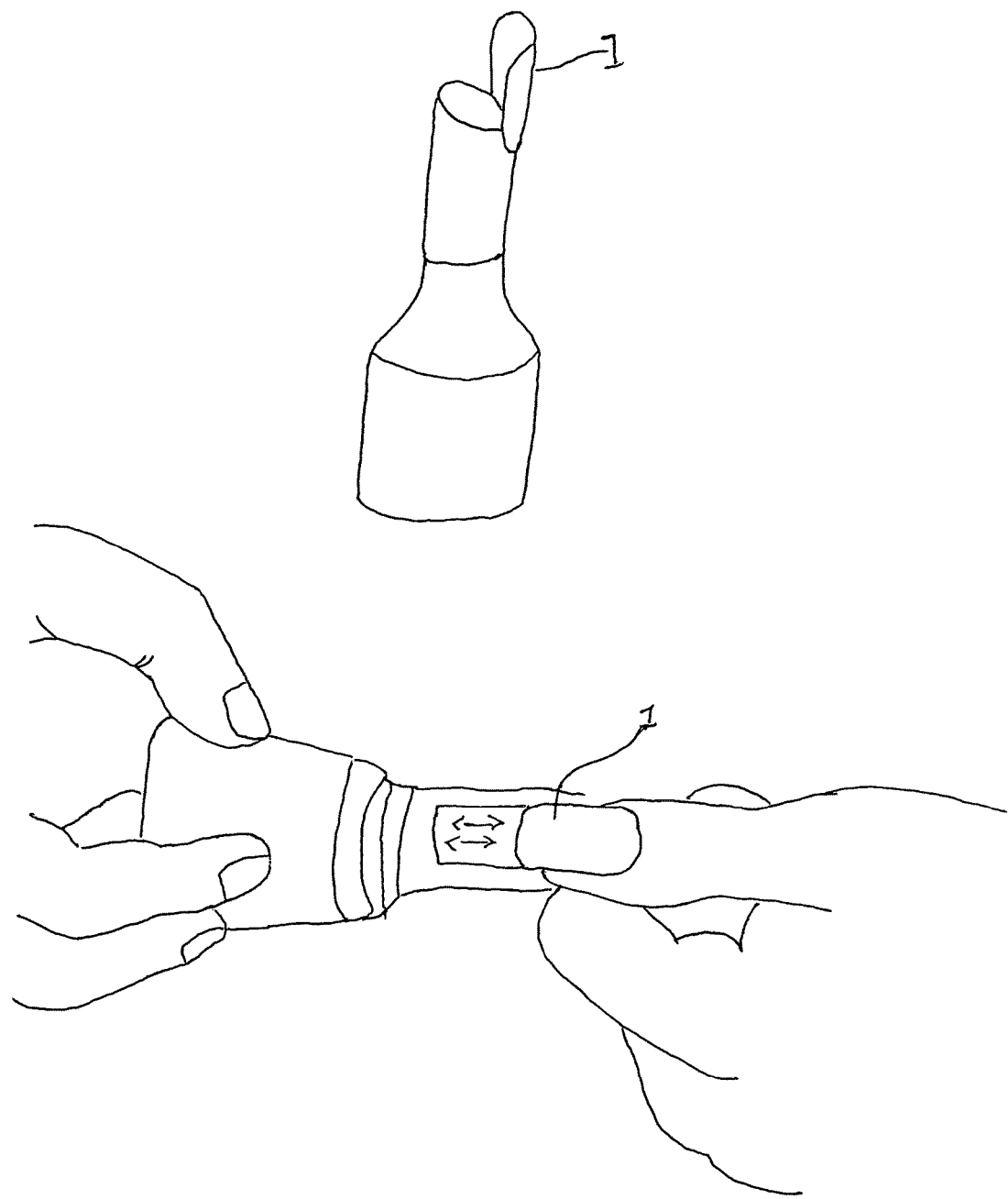
FIG. 2 shows the protruding portion of the nail cap sliding into place overlaying the customer's nail bed via its dimensionally thin and innate concave design.

Referring to FIG. 2 the tool 1 is a dual purpose tool and is accurate in shape. Its innate curvature and thinness replicates the shape of an actual fingernail and is so shaped so that when in use, it is simply overlaid over the surface of a customer's existing nail so that the person is capable of envisioning the look of the polish contents contained in the bottle after actual application.

Figure 3:
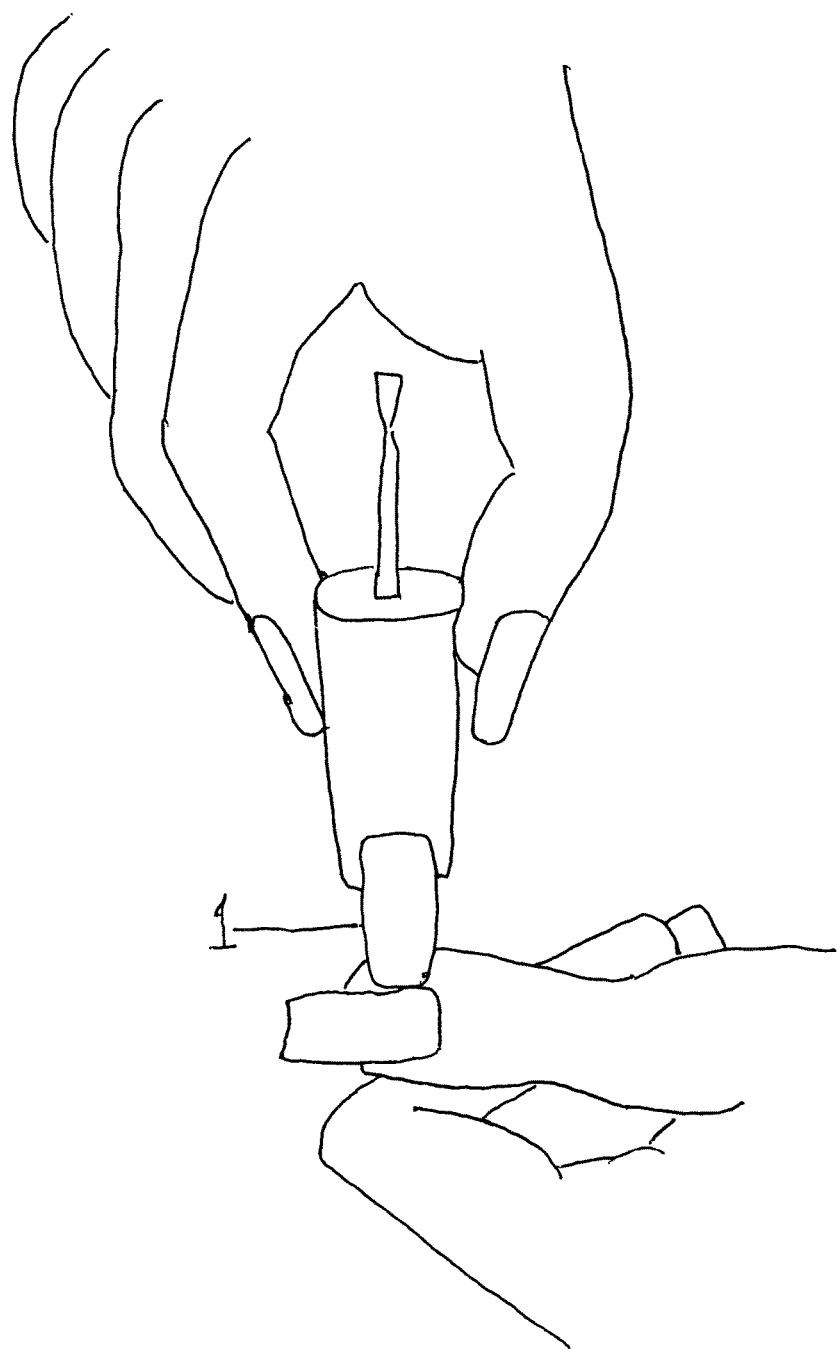
FIG. 3 shows the protruding portion of the cap being utilized as an excess polish removal tool.
Figure 4:
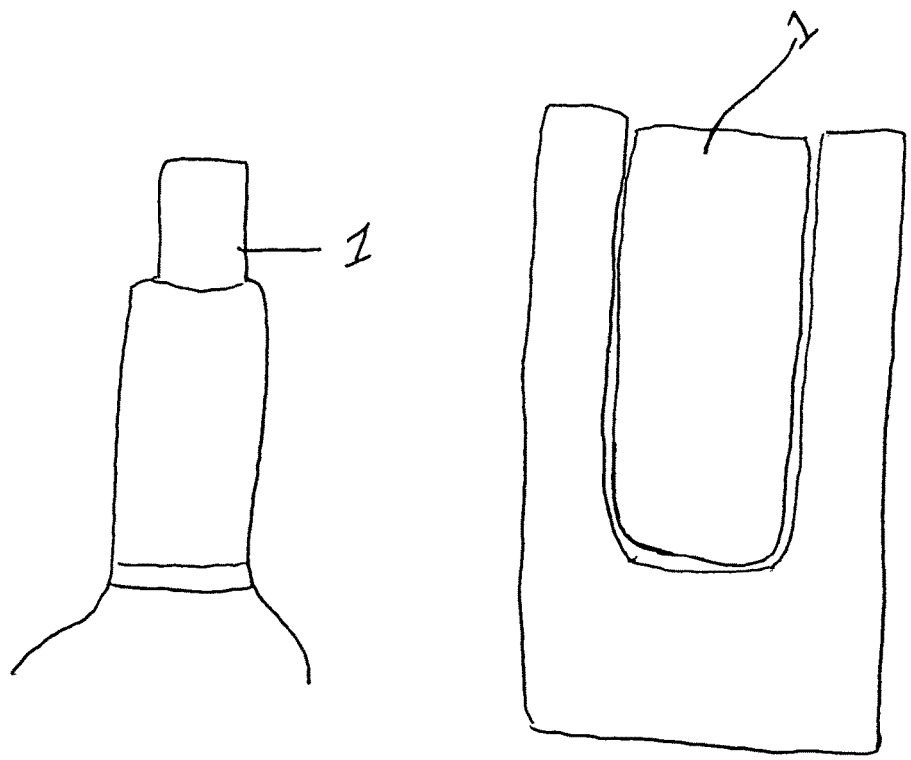
FIG. 4 is a depiction of the cap member wherein the protruding portion is able to slide within the cap's structure so that the protruding member is flush with the cap surface until use is desired.
Figure 5:
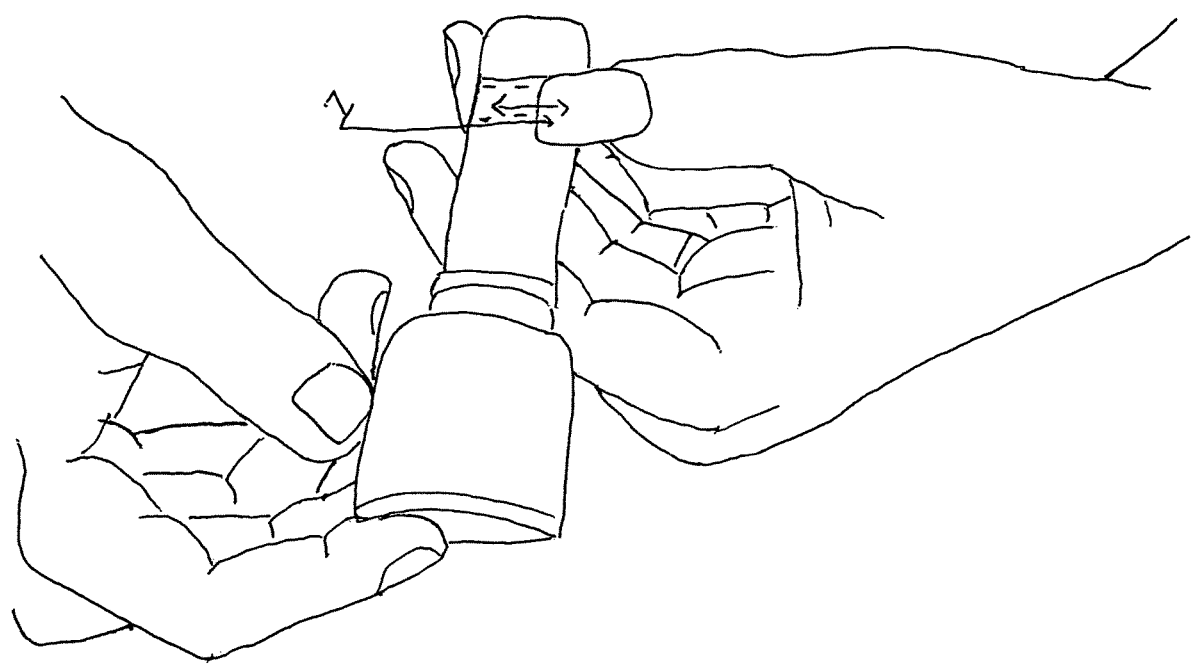
FIG. 5 shows the protruding portion of the cap sliding in a sideways fashion.
Figure 6:
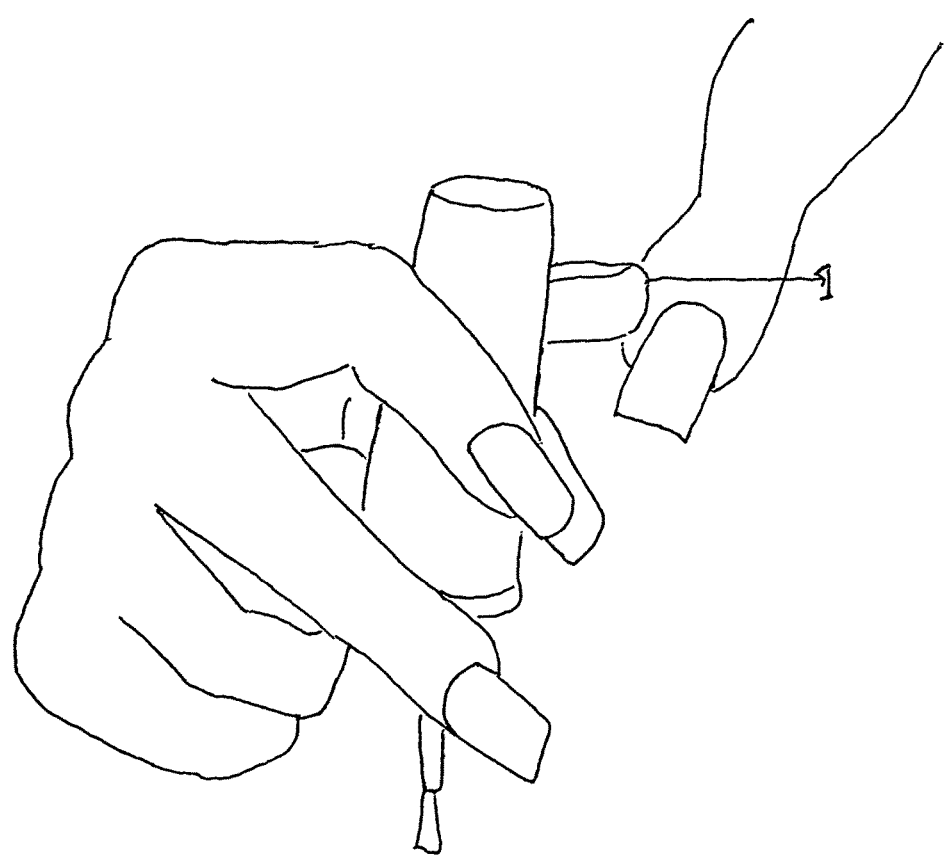
FIG. 6 shows the protruding portion of FIG. 5 in use as a removal tool.
Figure 7:
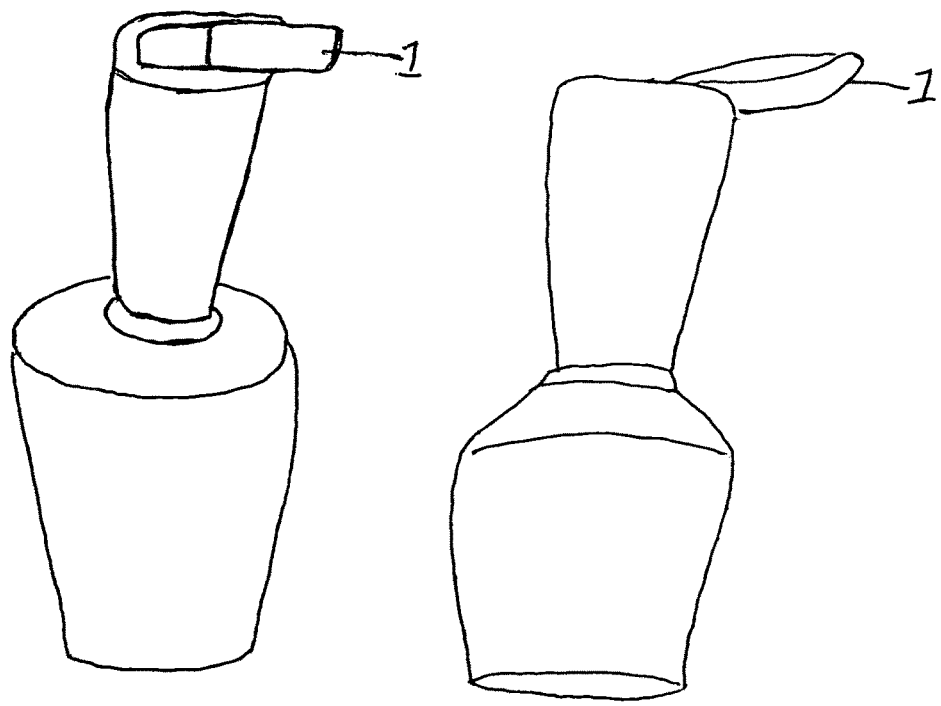
FIG. 7 shows the protruding portion of the cap sliding out from the top portion of the cap structure.

Turning now to FIG. 3 the accurate member 1 is also thin enough to allow for its use as a knife type tool to remove any polish applied to the skin or cuticles of the person during actual polish application. This permits the applier of the polish to have an application free of any unwanted coloration of areas around the nail itself.

The protruding member may be a stationary protruding portion of the cap as shown in FIG. 1 or may have a sliding mechanism as shown in FIGS. 2, 4, 5, 6 and 7. In all of these cases the protruding member of the cap is slid out linearly, (see the arrows in FIGS. 2 and 5), from the surface of the cap to a position where it is capable of serving as an excessive removal tool or color overlay.

In all cases, the protruding member is a combination removal aid and color tool thus creating a unique dual purpose device. By use of this member, a customer can remove any excess unwanted paint giving a professional appearance to the application of the contents of the bottle without having to resort to any other means during application as well as envision more accurately the after effects of the application of the contents of the bottle.

Figure 8A:
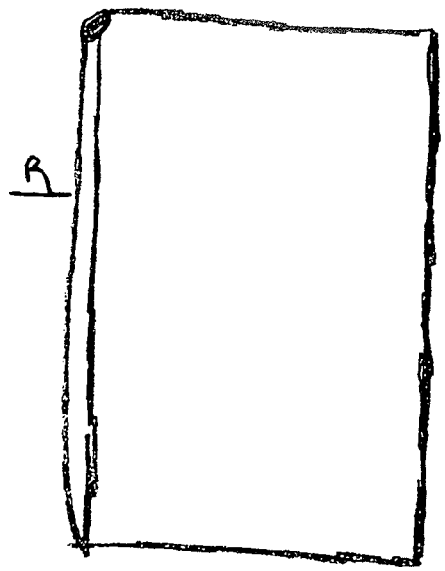
FIG. 8A shows a nail polish bottle with the nail member resting on the bottle's cap.
Figure 8B:
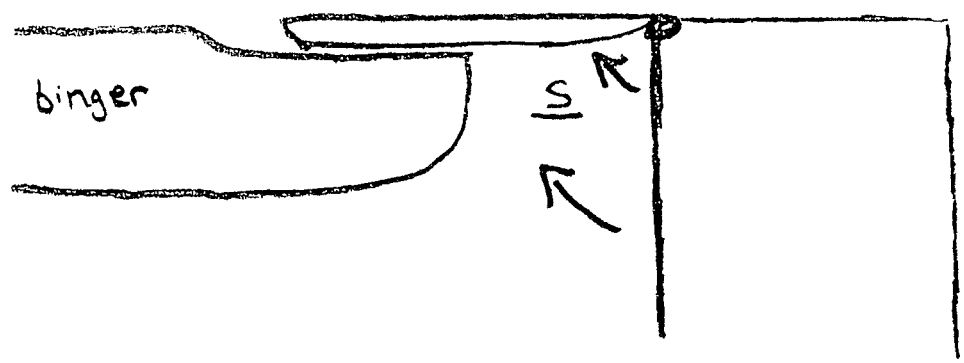
FIG. 8B shows a nail polish bottle with the nail member popped off the bottle's cap.

Modification and variation can be made to the disclosed invention without departing from the scope of the invention as described. Those skilled in the art will appreciate the applications of the present invention herein are varied. The extension of the nail cap as noted in FIGS. 1, 2, 4, 5, 6, and 7 may come from anywhere within the scope of the cap's dimensions. The extension of the nail cap may come from a combination of any and all of the different mechanisms being used but not limited to any particular one. For the nail may also pop up or rise from anywhere on the lid's outer surface or inner surface, as depicted in FIGS. 8A and 8B. as depicted in FIG. 8A, the nail polish bottle has the nail member R resting on the bottle's cap. As depicted in FIG. 8B, the nail polish bottle has the nail member S popped up from the bottle's cap. As understood by one of ordinary skill in the art, FIGS. 8A and 8B depict a conventional hinge element to provide the movement of the nail member. The fake nail may lift from anywhere inside or outside the lid's diameter.

What is claimed is:

1. A nail polish container, comprising:
a nail polish bottle, wherein the nail polish bottle has a longitudinally extending bottle cap attached to the bottle;
the bottle cap having a recessed portion and a nail-like component being sized and shaped to resemble a human nail, the nail-like component being configured to be moveably attached to the bottle cap such that the nail-like component is linearly slid between a retracted state in which the nail-like component is fully accommodated within the recessed portion and an extended state in which at least a portion of the nail-like component protrudes away from the recessed portion.

2. The nail polish container according to claim 1, wherein the recessed portion is longitudinally aligned with the longitudinal axis of the bottle cap.

3. The nail polish container according to claim 1, wherein the recessed portion is transvers to the longitudinal axis of the bottle cap.

4. The nail polish container according to claim 1, wherein the recessed portion is located on the top surface of the bottle cap and is disposed transvers to the longitudinal axis of the bottle cap.

5. The nail polish container according to claim 1, further comprising nail polish of a predetermined color disposed within the nail polish bottle and wherein the nail-like component is colored to correspond to the predetermined color of the polish.

* * * * *